H. BOLAS.
CONTROL OF THE AILERONS AND ELEVATORS OF AIRCRAFT.
APPLICATION FILED JAN. 6, 1921.

1,376,740.

Patented May 3, 1921.
2 SHEETS—SHEET 1.

HAROLD BOLAS.
INVENTOR.
BY George T. Folkes
ATTORNEY.

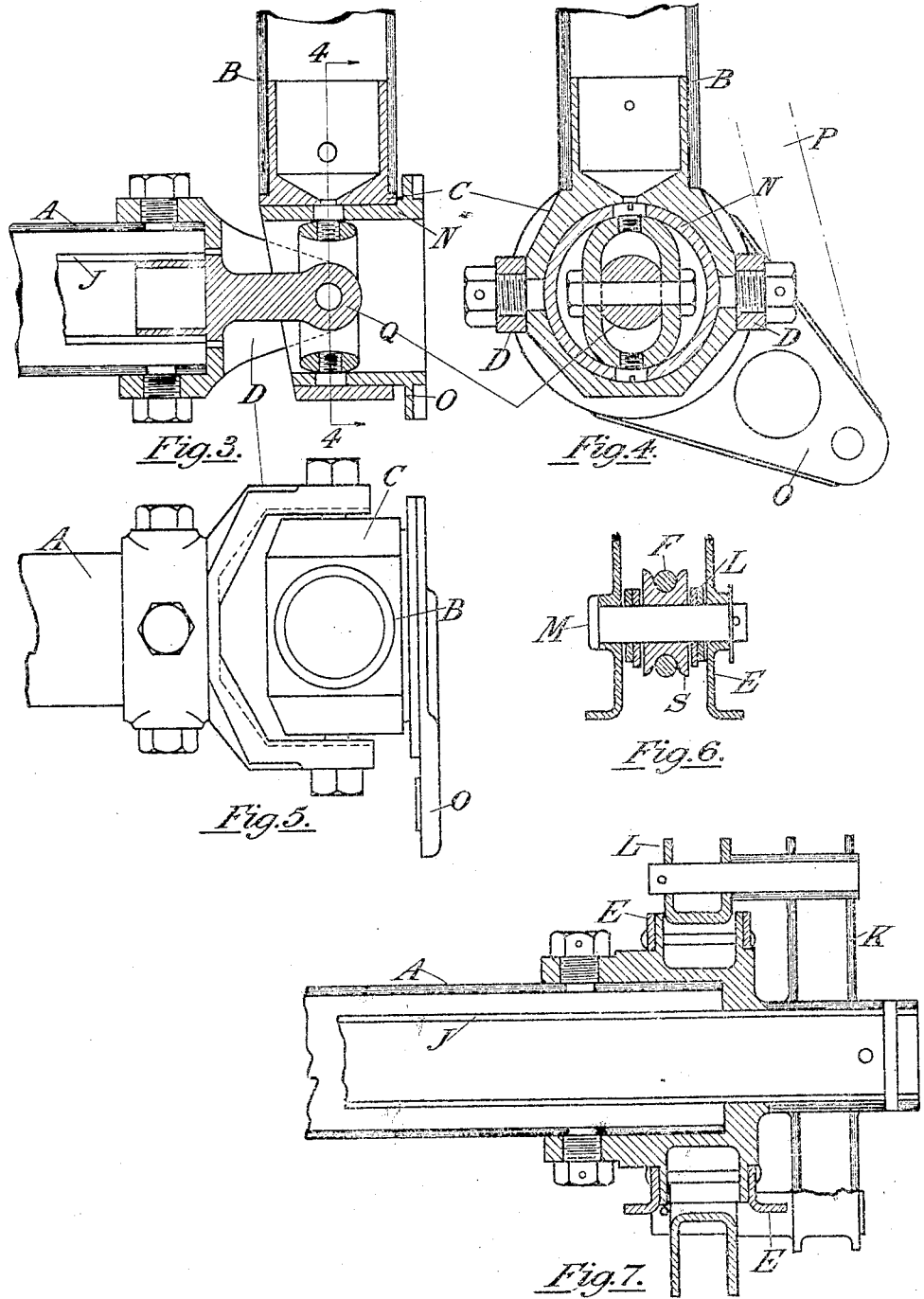

UNITED STATES PATENT OFFICE.

HAROLD BOLAS, OF CLIFTON, BRISTOL, ENGLAND, ASSIGNOR TO GEORGE GEACH PARNALL, OF PARK ROW, BRISTOL, ENGLAND.

CONTROL OF THE AILERONS AND ELEVATORS OF AIRCRAFT.

1,376,740.  Specification of Letters Patent.  Patented May 3, 1921.

Application filed January 6, 1921. Serial No. 435,433.

*To all whom it may concern:*

Be it known that I, HAROLD BOLAS, a subject of the King of Great Britain, residing at 7 Windsor Terrace, Clifton, Bristol, England, have invented a new and useful Improvement Connected with the Control of the Ailerons and Elevators of Aircraft; and he does hereby declare the following to be a full, clear, and exact description of the same.

This invention has reference to improvements connected with the control of the ailerons and elevators of aircraft and has for its object to provide an aircraft control in which the angular position of the ailerons relative to the main plane and the angular position of the elevators relative to the tail plane can be varied either simultaneously or independently from a single hand-lever, and consists in means on the hand-lever for varying the extent of the movement imparted to the ailerons and elevators for a given movement to the hand-lever.

The preferred construction of this invention will now be described in conjunction with the accompanying drawings wherein similar reference letters indicate similar parts in the several views.

Figure 1 is a perspective view of the mechanism comprising the present invention.

Fig. 1ª is a sectional elevation taken on the center line of the control lever and is introduced for the purpose of showing the means of locking the slidable sleeve in position on the control lever.

Fig. 3 is a sectional elevation to a larger scale through the universal joint coupling connecting the control lever with the fore and aft shafts.

Fig. 4 is a cross sectional elevation on line 4—4 of Fig. 3.

Fig. 5 is a plan of Fig. 3.

Fig 6 is a cross sectional elevation on line 6—6 of Fig 2. and

Fig. 7 is a cross sectional elevation on line 7—7 of Fig. 2.

Figure 1A:
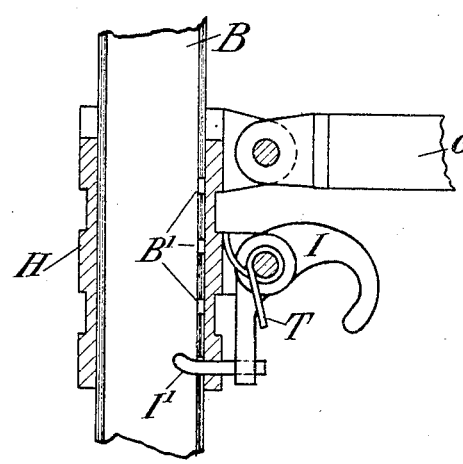
Figure 1:
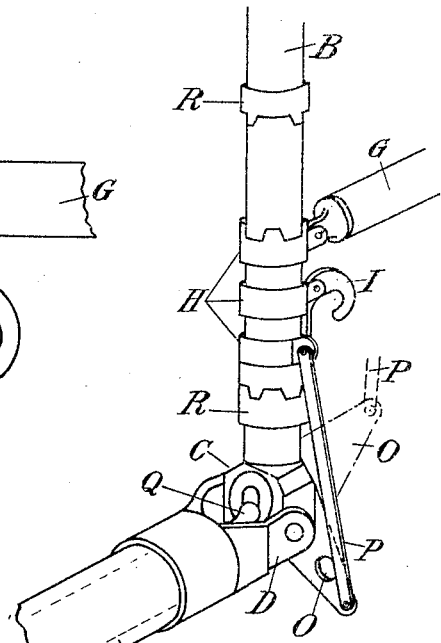
Figure 2:
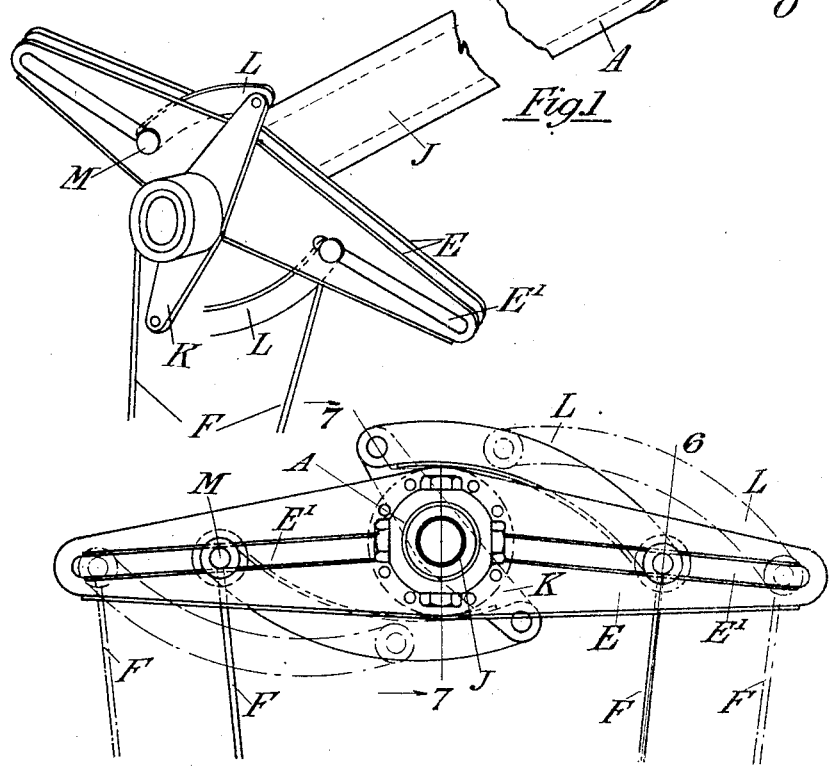
Fig. 2 is a front elevation of the aileron lever and its coöperating parts.

The fore and aft tubular shaft A is supported in bearngs (not shown) fixed in the fuselage of the aircraft. One end of the shaft A is connected to the control lever B through the pin connected members C and D. At the other end of the shaft A is secured the aileron control lever E which is of duplex construction and has connection to the aileron cables F as will hereinafter appear. A lateral motion of the control lever B rocks the shaft A and transmits motion to the aileron lever E; fore and aft movement of the control lever B is not transmitted to the shaft A, but transmits motion to the elevators by means of the rod G which is pivotally connected to a sleeve H which is slidably mounted on the control lever B and locked in the desired position by the pilot, the locking or releasing being effected by means of the hooked trigger I. The hooked trigger I is pivotally mounted on the slidable sleeve H and the Fig. 1ª clearly illustrates the means whereby this trigger locks the sleeve H in the desired position on the control lever B. It will be observed that the trigger I is formed with two arms the vertical arm being provided at its lower end with a segmental pin I' which is adapted to pass through a hole in the lower flange of the sleeve H and enter a registering hole in the control lever B. A series of these holes B' are arranged at intervals in the control lever B and any one of these holes is adapted to be engaged by the segmental pin I' according to the position of the slidable sleeve H and so maintain the sleeve in the desired setting. The hooked part of the trigger I is of a convenient shape for engagement by the finger for the purpose of disengaging the trigger from the control lever, and a coiled spring T is mounted on the pivot of the trigger I for the purpose of normally maintaining the segmental pin I' in position in the registering holes between the sleeve and the control lever. It will be clear that the vertical movement of the sleeve H simultaneously varies the position of the pivoted end of the rod G and the pivoted end of the rod P for the purpose of adjusting the angular position of the elevators and ailerons as hereinafter fully described.

It will be clear that the nearer the sleeve H is to the top of the control lever B the greater is the movement transmitted to the rod G.

Simultaneous adjustment of the amount of movement of the aileron cables F is obtained as follows: Concentric with and contained within the tubular shaft A is a second tubular shaft J having bearing in the two end fittings of the tube A. Attached to the shaft J and situated close to the aileron lever E is the two armed lever K which is pivotally connected by the links L which are of channel formation with the central part of the channel section cut away at the ends. These links L are connected to pins M. The pins M by means of the pulleys S carry the aileron cables F and can slide in the slots E' in the aileron lever E. The control lever bottom member C is provided with a rotatable liner N (see Figs. 3 and 4) which is rigidly fixed to a lever O which is in turn pivotally connected at its outer end by a connecting link P to the slidable sleeve H. Connection between the liner N and the tubular shaft J is effected by means of a Hooke's universal joint Q which will transmit torsion from the liner N to the shaft J, but allows freedom in other directions.

Vertical motion of the sleeve H on the control lever B by means of the connecting rod P and the lever O rotates the liner N and thereby rotates the tubular shaft J through the universal joint Q, the shaft J in turn rocking the two armed lever K which through the links L transmits adjustment to the pins M along the slots E' and therefore to the cables F which are connected to the ailerons. For example, if the sleeve H is raised the pins M slide outward toward the outer ends of the slots E' of the aileron levers E thus lengthening the effective radius arm of the aileron cables and increasing the angular movement of the ailerons; it will be obvious that a lowering of the sleeve H has the opposite effect and decreases the angular movement of the ailerons.

When the sleeve H is in a locked position upon the control lever B, the lever O and the control lever are virtually one member and hence the tubular shafts A and J rotate equally for a given lateral motion of the control lever B and the pins M may consequently be looked upon as locked in position within the slots E' in the aileron lever E; at the same time the Hooke's joint Q permits the control lever B to pivot freely in a fore and aft direction irrespective of the angular position of the lever O whereby the adjustment of the elevators is obtained through the rod G.

For the purpose of limiting the motion of the slidable sleeve H upon the control lever B stops R are secured to the control lever and are engaged by the sleeve H at its top or bottom position.

Generally speaking this variable angular displacement mechanism occupies normally the position for ordinary speed of flight, or the alternative position for slow flying speed, but if required variable positions between these two extremes may be provided for.

Claims:—

1. In an aircraft control in which the angular position of the ailerons relative to the main plane and the angular position of the elevators relative to the tail plane can be varied either simultaneously or independently from a single hand-lever, means on the hand-lever for varying the extent of the movement imparted to the ailerons and elevators for a given movement of the hand-lever.

2. In an aircraft control in which the angular position of the ailerons relative to the main plane and the angular position of the elevators relative to the tail plane can be varied either simultaneously or independently from a single hand-lever, an adjustable sleeve mounted on said lever, said sleeve being connected to mechanism for adjusting the effective radius arm of the aileron cables, and pivotally connected to the rod for adjusting the elevators.

3. In an aircraft control in which the angular position of the ailerons relative to the main plane and the angular position of the elevators relative to the tail plane can be varied either simultaneously or independently from a single hand-lever, the control mechanism comprising an adjustable sleeve slidably mounted on the said lever, said sleeve being pivotally connected to a rod controlling the elevators and connected by means of a link to a lever which in turn is connected to a rotatable liner which is coupled to a universal joint formed at the inner end of a tubular shaft, said tubular shaft being connected to a two-armed rocking lever pivotally connected by links to adjustable pins, said pins carrying the ends of the aileron cables and being adjustable within slots in a lever mounted on an outer tubular shaft which surrounds the said inner tubular shaft.

4. In an aircraft control in which the angular position of the ailerons relative to the main plane and the angular position of the elevators relative to the tail plane can be varied either simultaneously or independently from a single hand-lever, the control mechanism comprising a sleeve slidably mounted on said lever and pivotally connected to the rod controlling the elevators, a link pivotally connected to said sleeve, a lever pivotally connected to said link, a rotatable liner connected to said lever and coupled to a universal joint, said universal joint being mounted on one end of an inner tubular shaft, said shaft having mounted on its other end a two-armed rocking lever, said lever being pivotally connected to links, said links having pins mounted therein which have a determined path in slots formed in the aileron control lever, said links having pulleys mounted thereon to which the ends of the aileron cables are attached, and an outer tubular shaft which surrounds the said inner tubular shaft and carries the aileron control lever.

5. In an aircraft control in which the angular position of the ailerons relative to the main plane and the angular position of the elevators relative to the tail plane can be varied either simultaneously or independently from a single hand-lever, the control mechanism comprising a sleeve slidably mounted on said lever and pivotally connected to the rod controlling the elevators, a link pivotally connected to said sleeve, a lever pivotally connected to said link, a rotatable liner connected to said lever and coupled to a universal joint, said universal joint being mounted on one end of an inner tubular shaft, said shaft having mounted on its other end a two-armed rocking lever, said lever being pivotally connected to links, said links having pins mounted therein which have a determined path in slots formed in the aileron control lever, said links having pulleys mounted thereon to which the ends of the aileron cables are attached, an outer tubular shaft which surrounds the said inner tubular shaft and carries the aileron control lever, and a trigger device pivotally mounted on said adjustable sleeve and adapted to engage apertures formed in the control lever.

In testimony whereof, I have signed my name to this specification.

HAROLD BOLAS.